United States Patent [19]

Ohta et al.

[11] Patent Number: 4,944,375
[45] Date of Patent: Jul. 31, 1990

[54] REDUCTION GEARING DEVICE FOR A WINDSHIELD WIPER MOTOR INCLUDING A UNIDIRECTIONAL BRAKE

[75] Inventors: Kenji Ohta; Yasuo Ohashi, both of Yokohama, Japan

[73] Assignee: Jidosha Denki Kogyo Kabushiki Kaisha, Kanagawa, Japan

[21] Appl. No.: 746,692

[22] Filed: Jun. 20, 1985

[30] Foreign Application Priority Data

Jun. 22, 1984 [JP] Japan .............................. 59-93942[U]

[51] Int. Cl.⁵ .......................... F16D 67/02; B60T 7/12
[52] U.S. Cl. ...................................... 192/8 R; 192/20; 15/250.3
[58] Field of Search .............................. 192/7, 8 R, 20; 15/250.13, 250.17, 250.3

[56] References Cited

U.S. PATENT DOCUMENTS

| | | |
|---|---|---|
| 2,402,073 | 6/1946 | Newell ................... 192/8 R |
| 3,237,735 | 3/1966 | Jayne ..................... 192/8 R |
| 3,448,840 | 6/1969 | Rosin ..................... 192/8 R |
| 3,576,240 | 4/1971 | Nicholson ............... 192/8 R |
| 3,692,161 | 9/1972 | Katsaren et al. ....... 192/8 R |
| 3,734,254 | 5/1973 | Yanikoshi ............ 192/8 R X |
| 3,797,614 | 3/1974 | McCay, Jr. .......... 192/8 R X |
| 4,226,311 | 10/1980 | Johnson et al. ....... 192/8 R |
| 4,262,782 | 4/1981 | Kouth ..................... 192/8 R |
| 4,399,380 | 8/1983 | Hirano .............. 15/250.3 X |

*Primary Examiner*—Dwight Diehl
*Attorney, Agent, or Firm*—Sughrue, Mion, Zinn, Macpeak & Seas

[57] ABSTRACT

A reduction gearing device of a windshield wiper motor is disclosed, which comprises a gearing mechanism having a high transmission efficiency and a stop-position controlling device. The gearing mechanism is provided with a unidirectional clutch, or an output shaft holding part comprising a bearing and a rotation controller provided with spring and roll for controlling the rotation in only one direction.

4 Claims, 5 Drawing Sheets

REDUCTION GEARING DEVICE FOR A WINDSHIELD WIPER MOTOR INCLUDING A UNIDIRECTIONAL BRAKE

BACKGROUND OF THE INVENTION

1. Field of the Invention

This invention relates to an improvement in a reduction gearing device of a windshield wiper motor suitable for use in an electric windshield wiper provided with a stop-position controlling system, which wipes raindrops or the like from a windshield glass of an automotive vehicle so as not to obstruct the driving of the vehicle and stops a wiper blade to a predetermined position after the wiping.

2. Description of the Prior Art

As the conventional reduction gearing device of the wiper motor, there is a structure as shown in FIGS. 1 and 2. Further, the conventional stop-position controlling system is a structure as shown in FIG. 3.

Particularly, FIG. 1 shows a state of removing a cover from the gearing mechanical portion of the wiper motor, while FIG. 2 shows a partial section of the gearing mechanical portion of the wiper motor.

In FIGS. 1 and 2, numeral 1 is a motor for driving a wiper of a vehicle, numeral 2 is a gear housing connected to a housing of the motor 1, and numeral 3 is a cover for the gear housing 2. The turning force of the motor 1 is transmitted to a worm shaft 4 extending from a motor shaft of the motor 1. The worm shaft 4 is provided with right-threaded worm at one end side and left-threaded worm at the other end side. These worms are in engage with large-size gear members 5a, 6a in two-stage intermediate gears 5, 6 mounted in the gear housing 2, respectively. In this case, the intermediate gears 5, 6 are arranged at opposite sides on the worm shaft 4 so as to turn them in the same direction. Further, small-size gear members 5b, 6b of the intermediate gears 5, 6 are in engage with an output gear 7b pivotably supported through a metal bearing 7a in the gear housing 2. Thus, a rotary shaft of the output gear 7b is an output shaft 7c for the transmission of rotations.

In the reduction gearing device of the above structure, the right-threaded worm and left-threaded worm are provided on the worm shaft 4 and are in engage with the intermediate gears 5, 6 engaging with the output gear 7, whereby radial loadings produced in the worms due to the rotation of the worm shaft 4 are substantially offset with each other and also thrust loading in axial direction can completely be restrained. Therefore, this reduction gearing device becomes a gearing mechanism mitigating a transmission loss of rotation in high efficiencey.

There will be described the stop-position controlling system as shown in FIG. 3 below.

In FIG. 3, numeral 7b is the output gear as described above and is provided with a first contact plate 8 of a disc shape having a folding fan-shaped notch portion and a second contact plate 9 disposed at a position corresponding to the notch portion apart from the first contact plate 8 and protruded outward from the first contact plate 8. With respect to the output gear 7b, as shown in FIG. 2, the cover 3 of gear housing 2 is provided with a first contactor 12, which is connected between the motor 1 and breaker 11 connecting at one end to a power source 10 and protecting the motor during the locking thereof and is capable of coming into contact with only the second contact plate 9, and a second contactor 14 connected to an off-terminal 13 and being capable of coming into contact with both the first and second contact plates 8 and 9, whereby the first contactor 12 becomes connected to the second contactor 14 through the second contact plate 9 every one rotation of the output gear 7b. Moreover, a wiper blade (not shown) performs one reciprocating movement every one rotation of the output gear 7b. Particularly, when the contactors 12, 14 are connected to each other through the second contact plate 9, the wiper blade arrives at a wipe-finishing position. In FIG. 3, numeral 15 is an earth terminal of a control switch, numeral 16 is a high-speed operating terminal, numeral 17 is a low-speed operating terminal, and numeral 18 is a movable contact connected to a wiper switch.

When the wiper switch is randomly turned off during the operation of the wiper provided with the stop position controlling system of the above structure, the movable contact 18 renders the off-terminal 13 and the low-speed operating terminal 17 into the contact state. In this case, the operation of the wiper is still continued because electric current flows through the contacting of the second contactor 14 with the first rotating contact plate 8. However, when the second contactor 14 is separated from the first contact plate 8, electric current to the motor 1 is shut off. Thereafter, the second contactor 14 and the first contactor 12 arc rendered into contact state through the second contact plate 9, whereby the connection to the earth side of the power source 10 is released to form a short-circuit of the motor 1, resulting in the braking of the wiper operation. Thus, the wiper blade can always be stopped at a wipe-finishing position.

In the conventional reduction gearing device of the windshield wiper motor provided with the stop position controlling system as mentioned above, however, when the movement of the wiper blade is stopped by the weight of the lying snow in a snowy day of winter season, the breaker 11 actuates for the protection of the motor to shut off electric current, whereby the rotation of the motor 1 is forcedly stopped from exterior, which causes the reverse rotation as a reaction. In this case, since the reduction gearing device connected to the motor 1 is high in the efficiency, the reverse rotation of the motor is transmitted to the reduction gearing device to apply impact torque to each gear in the gearing mechanism, resulting in the damaging of the gear. Further, when the wiper switch is intermittently switched on-off during snowfall, snow may be lain near the wipe-finishing position, so that even if the wiper switch is turned off, the wiper blade is not stopped to the normal wipe finishing position. In this case, when the wiper blade is forcedly stopped between the first contact plate 8 and the second contact plate 9, electric current is shut off, but the motor 1 causes reverse rotation as a reaction of the stopping of the wiper blade, whereby the second contactor 14 may slightly contact with the first contact plate 8 to cause sparking. Then, such a sparking turns on electricity, but the wiper blade is forcedly stopped to a position apart from the normal stop-position by the lying snow, so that the motor 1 is locked and the breaker 11 actuates to shut off electric current. However, the breaker 11 is rapidly released to turn on electric current, but the wiper blade still stops forcedly, so that the above mentioned sparking is repeated. Therefore, when the output gear 7a is made from a synthetic resin, it is melted out by the heat of repeated sparks, so that the second contactor 14 enters into the molten portion of the output gear 7a to produce troubles such as unsatisfactorily automatic stopping of the wiper blade and the like.

SUMMARY OF THE INVENTION

It is, therefore, an object of the Invention to solve the aforementioned drawbacks of the prior art and to provide a reduction gearing device of a windshield wiper motor which is long in the service life and has a high transmission efficiency without transmitting reverse rotation of the motor produced by a reaction due to the shutting off of electric current during the locking of the motor.

According to a first aspect of the invention, a unidirectional brake is arranged on a part of the gearing mechanism having a high transmission efficiency in the reduction gearing device.

According to a second aspect of the invention, the output shaft of the gearing mechanism having high transmission efficiency in the reduction gearing device is provided with an output shaft holding part comprising a bearing for supporting the output shaft and a rotation controller provided with at least one roll and spring for controlling the rotation of the output shaft in one direction.

BRIEF DESCRIPTION OF THE DRAWINGS

The invention will be described in detail with reference to the accompanying drawings, wherein.

Like parts are designated by like numerals in different figures.

DESCRIPTION OF THE PREFERRED EMBODIMENTS

Figure 1:
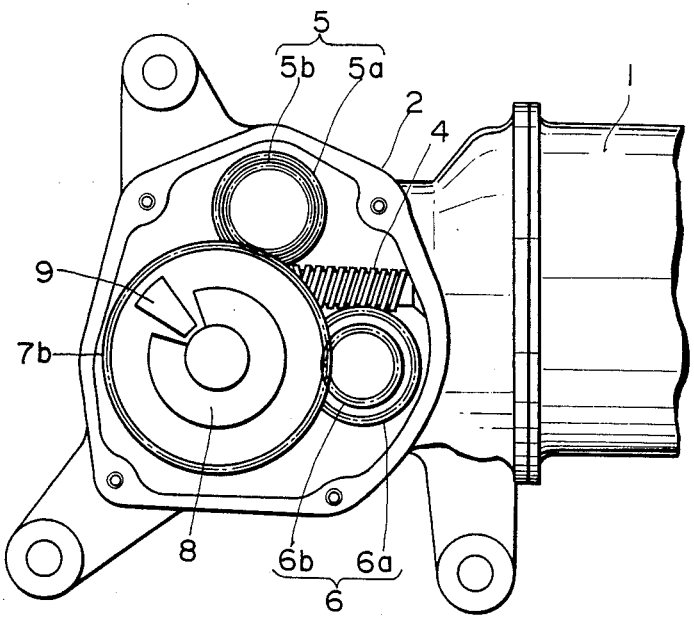
FIG. 1 is a schematically front view of the conventional reduction gearing device after the cover is removed therefrom as mentioned above.
Figure 2:
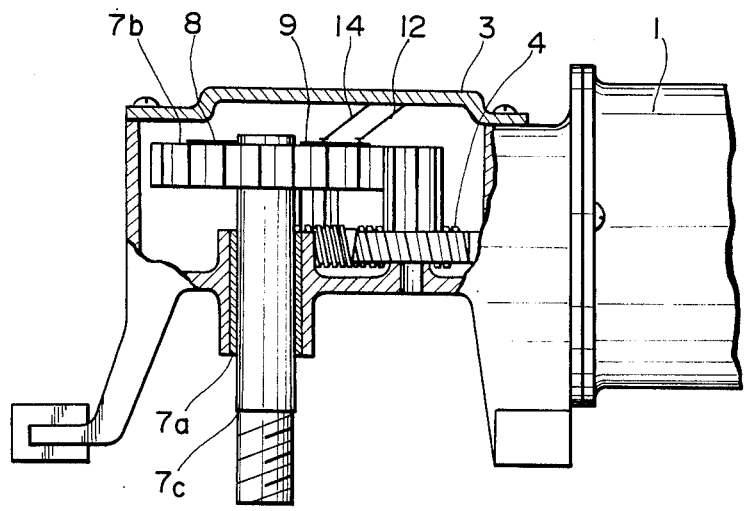
FIG. 2 is a side view partly shown in section of FIG. 1.
Figure 3:
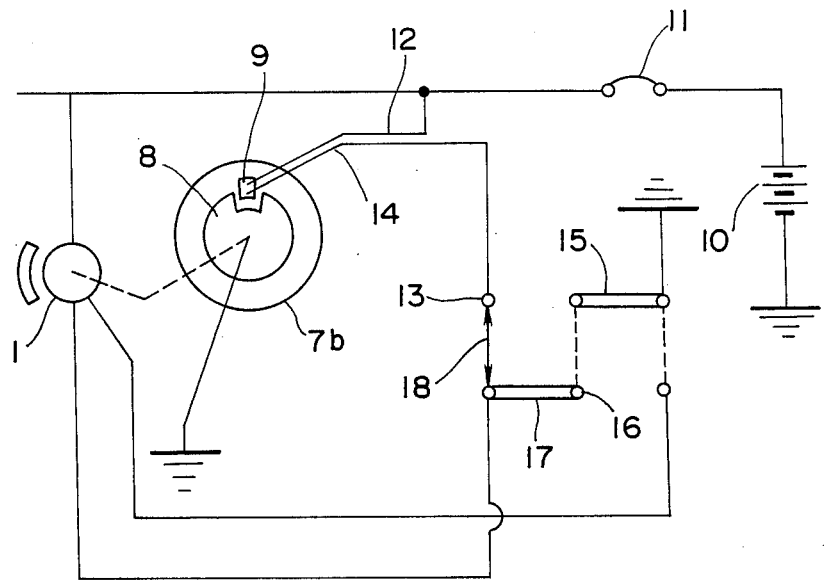
FIG. 3 is a circuit diagram illustrating the structure of the conventional stop-position controlling system as above.
Figure 4:
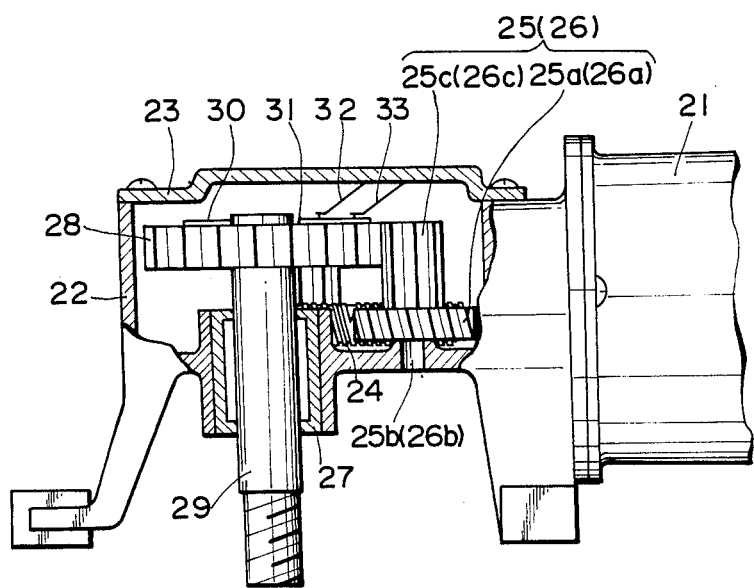
FIG. 4 is a side view partly shown in section of a first embodiment of the reduction gearing device according to the invention.

In FIGS. 4 and 5 are shown a first embodiment of the reduction gearing device according to the invention, wherein numeral 21 is a motor, numeral 22 is a gear housing connected to the motor 21, numeral 23 is a cover for the gear housing 22, and numeral 24 is a worm shaft extending from a motor shaft of the motor 21. The worm shaft 24 is provided with a right-threaded worm at one end side and a left-threaded worm at the other end side, which are engaged with large diameter gear members 25a, 26a in two stage intermediate gears 25, 26. The intermediate gears 25, 26 are fitted into intermediate shafts 25b, 26b disposed in the gear housing 22, respectively and pivotably supported therein.

In this case, the intermediate gears 25, 26 are arranged at opposite positions with respect to the worm shaft 24 so as to rotate them in the same direction. Further, small-diameter gear members 25c, 26c of the intermediate gears 25, 26 are engaged with an output gear 28, which is supported by a unidirectional brake 27 disposed in the gear housing 22 and being capable of rotating in only one direction.

The rotation shaft of the output gear 28 is an output shaft 29 for transmitting a reduced rotation number. Moreover, the output gear 28 makes one rotation with respect to one reciprocal movement of a wiper blade (not shown), so that an upper surface portion of the output gear 28 is utilized for the arrangement of a stop position controlling system. That is, a first contact plate 30 and a second contact plate 31 are disposed on the upper surface portion of the output gear 28. On the other hand, the cover 23 of the gear housing 22 is provided with a first electrical contactor 32 capable of contacting with the first and second contact plates 30, 31, and a second electrical contactor 33 capable of contacting with only the second contact plate 31.

Figure 5A:
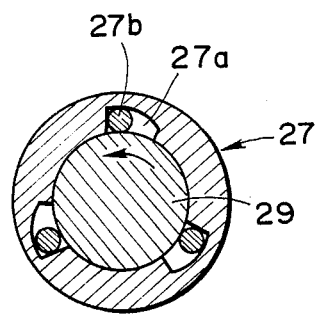
FIGS. 5a and 5b are schematically sectional views illustrating the structure and operating state of the unidirectional brake according to the invention, respectively.
Figure 5B:
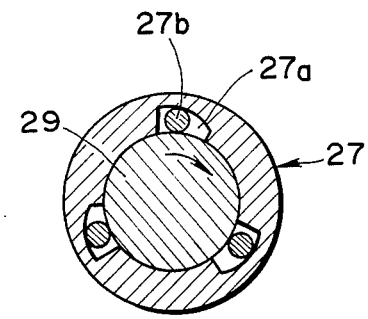

In the unidirectional brake 27 as shown in FIGS. 5a and 5b, plural holes 27a each having different distances in radial direction along the periphery thereof are formed in a part of a metal bearing for supporting the output shaft 29, and a roller 27b having a diameter smaller than the maximum distance of the hole 27a but larger than the minimum distance thereof is inserted into each of the holes 27a.

The operation of the reduction gearing device having the above structure will be described below.

The turning force of the motor 21 is transmitted to the worm shaft 24, whereby the intermediate gears 25, 26 in engagement with the right-threaded and left-threaded worms of the worm shaft 24 are rotated to rotate the output gear 28 which is in engagement with the intermediate gears 25, 26. When the rotation of the output shaft 29 is in the normal direction as shown in FIG. 5a, the rollers 27b of the unidirectional brake 27 do not obstruct the transmission of rotation, so that the wiper blade can be moved without troubles.

If the movement of the wiper blade is forcedly stopped by snow or the like, however, the locking of the motor 21 is caused to shut off electric current by the actuation of the breaker 11 for the protection of the motor, which is apt to reversely rotate the motor as a reaction. In this case, the reverse rotation is transmitted to the intermediate gears 25, 26 engaging with the worm shaft 24, which is apt to make the reverse rotation of the output shaft 29. If the reverse rotation of the output shaft 29 is caused, the rollers 27b moves toward the minimum distance of the holes 27a along the wall surface thereof to impede the rotation of the output shaft 29 as shown in FIG. 5b whereby the reverse rotation is stopped.

Figure 6:
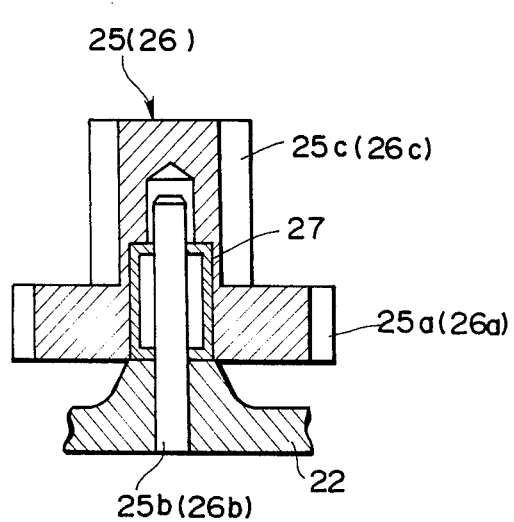
FIG. 6 is a schematically sectional view of a second embodiment of the main part of the reduction gearing device according to the invention.

In FIG. 6 is shown a second embodiment of the invention, wherein the unidirectional brake 27 is arranged inside either one of the intermediate gears 25 and 26.

For instance, the unidirectional brake 27 is disposed inside the intermediate gear 25, which is fitted onto the intermediate shaft 25b of the gear housing 22 and supported by the shaft so as to rotate in only one direction. In the intermediate gear 25, the large-diameter gear member 25a is in engagement with the worm shaft 24, and the small-diameter gear member 25c is in engagement with the output gear 28. In this case, the operation of the unidirectional brake 27 is the same as in the first embodiment. That is, in case of the normal rotation, the unidirectional brake 27 does not obstruct the transmission of rotation, so that the rotation of the worm shaft 24 is transmitted to the output gear 28. In case of tho reverse rotation, however, the unidirectional brake 27 obstructs the transmission of rotation, so that the reverse rotation of the worm 24 is not transmitted to the output gear 28.

Figure 7:
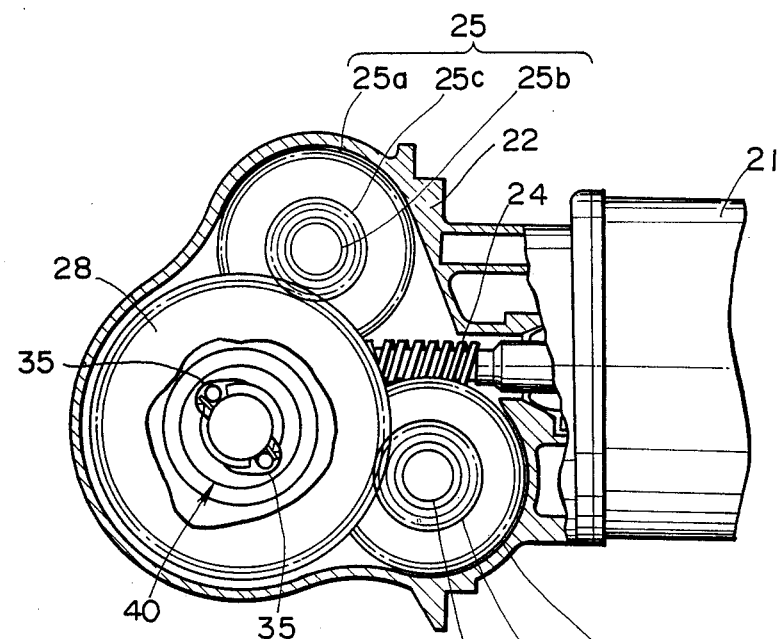
FIGS. 7 and 8 are front view, after the removal of the cover, and side view partly shown in section of a third embodiment of the reduction gearing device according to the invention respectively.
Figure 8:
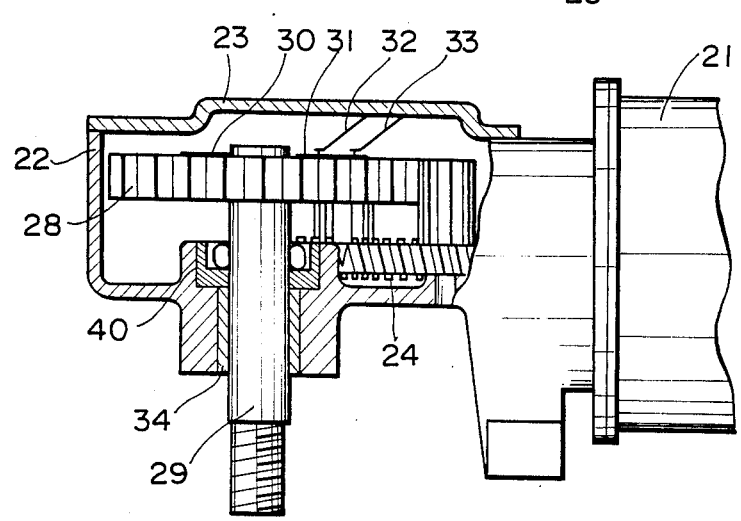

In FIGS. 7 and 8 is shown a third embodiment of the invention, wherein the output gear 28 is supported by an output shaft holding part 40 comprising a bearing 34 for supporting the output shaft 29 of the output gear 28 and a rotation controller 35 provided with at least one roller and spring for allowing the rotation of the output shaft 29 in only one direction and acting as a brake in the opposite direction. In this case, the bearing 34 and the rotation controller 35 are arranged in the gear housing 22.

Figure 9A:
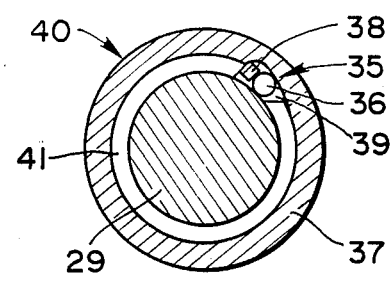
FIGS. 9a and 9b are schematically sectional views of the structure of the rotation controlling part according to the invention, respectively.
Figure 9B:
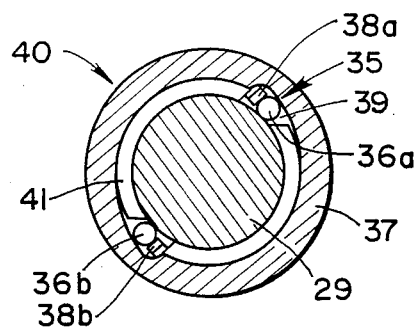

FIGS. 9a and 9b show the structure of the rotation controller 35 in the output shaft holding part 40 including the bearing 34, respectively. In the illustrated embodiment of FIG. 9a, the rotation controller 35 for controlling the rotation of the output shaft 29 in only one direction comprises a rollers 36 and a spring 38. In the embodiment of FIG. 9b the rotation controller 35 comprises two rollers 36a, 36b and two springs 38a, 38b. As shown in detail in FIGS. 9a and 9b, the output shaft 29 passes through the central portion of the rotation controller 35, while round rollers 36, 36a, 36b to be rebounded by leaf springs 38, 38a, 38b at one side are arranged on a periphery of an inner casing 41 located inside an outer casing 37 of the rotation controller 35. Further, the outer casing 37 is provided at its inner peripheral portion with a notched hole 39 having different distances in radial direction along the inner periphery of the casing 37. Moreover, the rollers 36 (36a, 36b) have a diameter smaller than the maximum distance of the hole 39 but larger than the minimum distance thereof.

Figure 10A:
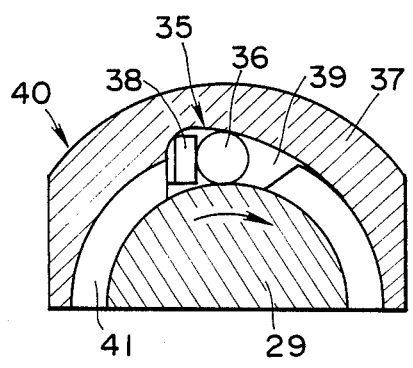
FIGS. 10a and 10b are partly sectional views illustrating the operating theories of the rotation controlling parts shown in FIGS. 9a and 9b, respectively.
Figure 10B:
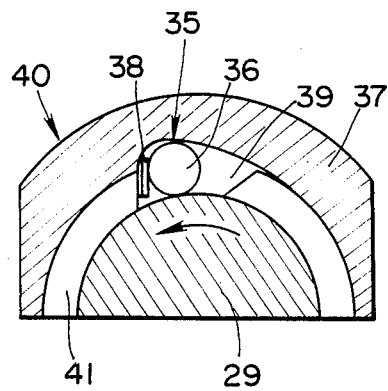

The operation of the reduction gearing device having the above structure will be described with reference to FIGS. 10a and 10b.

The turning force of the motor 21 is transmitted to the worm shaft 24 and further to the output gear 28 through the intermediate gears 25 and 26. When the rotation of the output shaft 29 is normal direction as shown in FIG. 10b, the rollers 36 (36a, 36b) in the rotation controller 35 does not obstruct the transmission of rotation, so that the wiper blade can be moved without troubles. If the wiper blade is forcedly stopped by snow or the like, however, the locking of the motor is caused to shut off electric current by the actuation of the breaker for the protection of the motor, which is apt to reversely rotate the motor as a reaction. In this case, the reverse rotation is transmitted to the intermediate gears 25, 26 engaging with the worm shaft 24, which is apt to make the reverse rotation of the output shaft 29. If it is intended to rotate the output shaft 29 in an arrow direction as shown in FIG. 10a, the roll 36 (36a, 36b) stops along the wall surface of the hole 39 formed in the inside of the outer casing 37 of the rotation controller 35 acting as a unidirectional brake, which obstructs the reverse rotation of the output shaft 29.

Therefore, there is caused no trouble of repeating turn-on and shut-off by shifting the rotation of the output shaft 29 from autostop position to thereby prevent the occurrence of troubles such as fusing of autostop plate made from synthetic resin and the like.

As mentioned above, according to the invention, the unidirectional brake is arranged in the gearing mechanism having a high transmission efficiency in the reduction gearing device of the windshield wiper motor, whereby the reverse rotation of the output shaft can be prevented without damaging the stop-position controlling system. Therefore, the invention has a merit that the service life of the wiper motor can considerably be prolonged with high transmission efficiency.

What is claimed is:

1. A reduction gearing device for a windshield wiper motor adapted to drive a wiper blade comprising a housing, a reduction gearing mechanism disposed in said housing having a plurality of gear members, bearing means rotatably supporting said gear members in said housing, electrical contact means for a stop position controlling system for the wiper motor operatively associated with one of said gear members for rotation therewith for stopping the wiper motor at a predetermined position, unidirectional brake means interposed between one of said gear members and said housing to prevent reverse of said gear members and said electrical contact means due to attempted reverse rotation of the wiper motor as a reaction when shut off due to forced stoppage of the wiper blade.

2. A reduction gearing device as set forth in claim 1 wherein one of said gear members includes an output shaft extending through said housing, said bearing means is comprised of a bearing member secured in said housing and surrounding said output shaft and said unidirectional brake means is comprised of at least one recess formed in said bearing member adjacent said shaft, said recess having a variable depth in the radial direction which increases from a minimum depth at one to a maximum depth at the other end in the direction of rotation of said shaft and at least one roller disposed in said recess having a diameter smaller than the maximum depth of said recess but larger than the minimum depth thereof.

3. A reduction gearing device according to claim 1 further comprising an intermediate shaft mounted within said housing, one of said gear members being rotatably mounted on said intermediate shaft, said bearing means being disposed intermediate said one of said gear members and said intermediate shaft and including said unidirectional brake means therein.

4. A reduction gearing device as set forth in claim 1 wherein one of said gear members includes an output shaft extending outwardly through said housing, said bearing means including a sleeve bearing for supporting said output shaft, said unidirectional brake means being disposed between said output shaft and said housing adjacent said bearing sleeve, said unidirectional brake mechanism comprising an outer casing secured to said housing and provided at its inner peripheral portion with at least one recess having a variable depth in the radial direction which increases from a minimum depth at one end to a maximum depth at the other end in the direction of rotation of said shaft, an inner casing located inside said outer casing and having at least one leaf spring associated therewith and at least one round roller disposed in said recess and having a diameter smaller than the maximum depth of said recess but larger than the minimum depth of said recess.

* * * * *